US006683621B1

(12) United States Patent
Rodriguez

(10) Patent No.: US 6,683,621 B1
(45) Date of Patent: Jan. 27, 2004

(54) VERTEX AND SPHERICAL NORMALIZATION CIRCUIT

(75) Inventor: Javier A. Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 09/631,717

(22) Filed: Aug. 3, 2000

(51) Int. Cl.[7] .............................................. G06T 15/00
(52) U.S. Cl. ..................................................... 345/643
(58) Field of Search ............................... 345/419, 422, 345/619, 620, 643, 581, 606

(56) References Cited

U.S. PATENT DOCUMENTS 5,369,737 A * 11/1994 Gholizadeh et al. ........ 345/423
6,417,851 B1 * 7/2002 Lindholm et al. .......... 345/426

* cited by examiner

*Primary Examiner*—Phu K. Nguyen
(74) *Attorney, Agent, or Firm*—Joseph P. Lally; Mark E. McBurney

(57) ABSTRACT

A normalization circuit suitable for use in a graphics adapter is disclosed. The circuit is configured to receive vertex data and includes a set of multiplexer circuits, a set of functional units, and a control circuit. The outputs of the set of multiplexer circuits provide inputs to the set of function units and the control circuit is configured to control the select inputs of the set of multiplexer units to calculate a unit normal vector and a unit eye vector from the received vertex data. The set of functiontional units may include a pair of floating point multipliers and a floating point adder. The inputs of the first floating point multiplier may be connected to outputs of first and second mulitplexers such that the first multiplier is enabled to generate square values for x, y, and z components of the vertex data. The inputs of the floating point adder may be connected to outputs of third and fourth multiplexers, wherein the floating point adders is enabled to generate a sum of squares values. The output of the floating point adder may be coupled to the input of an inverse square circuit. A first input to the second floating point multiplier may be connected to a fifth multiplexer circuit and a second input to the second floating point multiplier may be coupled to the output of the inverse square root circuit such that the second floating point multiplier is enabled to generate x, y, and z components of the unit normal vector and the unit eye vector.

16 Claims, 4 Drawing Sheets

VERTEX AND SPHERICAL NORMALIZATION CIRCUIT

BACKGROUND

1. Field of the Present Invention

The present invention generally relates to computer graphics and more particularly to a circuit that generates normalized vectors (unit vectors) that are specified by a graphics interface.

2. History of Related Art

Graphics display subsystems are almost universally encountered in microprocessor based computer systems to facilitate a variety of graphics tasks and applications including computer-assisted drafting, architectural design, simulation trainers for aircraft and other vehicles, molecular modeling, virtual reality applications, and video games. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling 3D graphic images. In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing volume, determining which of the graphic primitives are within the defined viewing volume, and rendering those graphic primitives as they would appear from the viewing point. This process can require a tremendous amount of computing power to keep pace with the ever increasingly complex graphics applications that are commercially available. Accordingly, designers of graphics systems and graphics applications are continuously seeking cost effective means for improving the efficiency at which graphic images are rendered and displayed.

Typically a software application program generates a 3D graphics scene, and provides the scene, along with lighting attributes, to an application programming interface (API) such as the OpenGL® API developed by Silicon Graphics, Inc. Complete documentation of OpenGL® is available in M. Woo et al., *OpenGL Programming Guide: The Official Guide to Learning OpenGL, Version* 1.2 (Addison Wesley Longman, Inc. 1999) and D. Schreiner, *OpenGL Reference Manual, Third Edition: The Official Reference Document to OpenGL, Version* 1.2 (Addison Wesley Longman, Inc. 1999), both of which are incorporated by reference herein.

A 3D graphics scene typically includes of a number of polygons that are delimited by sets of vertices. The vertices are combined to form larger primitives, such as triangles or other polygons. The triangles (or polygons) are combined to form surfaces, and the surfaces are combined to form objects. Each vertex is associated with a set of attributes. Vertex attributes may include a position, including three Cartesian coordinates x, y, and z, a material color, which describes the color of the object to which the vertex belongs, and a normal vector, which describes the direction to which the surface is facing at the vertex. Each vertex may also be associated with texture coordinates and/or an alpha (transparency) value. In addition, the scene itself may be associated with a set of attributes including, as examples, an ambient color that typically describes the amount of ambient light and one or more individual light sources. Each light source has a number of properties associated with it, including a direction, an ambient color, a diffuse color, and a specular color.

Rendering is employed within the graphics system to create two-dimensional image projections of a 3D graphics scene for display on a monitor or other display device. Typically, rendering includes processing geometric primitives (e.g., points, lines, and polygons) by performing one or more of the following operations as needed: transformation, clipping, culling, lighting, fog calculation, and texture coordinate generation. Rendering further includes processing the primitives to determine component pixel values for the display device, a process often referred to specifically as rasterization.

The OpenGL® API and other API's such as the DirectX® API from Microsoft define the allowed vertex and scene attributes and the equations used to determine attribute values. In a conventional graphics adapter, the calculations specified by a particular API are implemented in software. It will be appreciated that software calculations can adversely affect the performance of the graphics adapter, especially if the equations require complex, floating point calculations. It would therefore be desirable to implement, to the extent feasible, some or all of the calculations specified by a particular graphics API in dedicated hardware circuitry. Moreover, it would be desirable if the implemented solution balanced improved performance against cost by optimizing the hardware design to account for such factors as, the frequency with which the particular function or equation is invoked and the speed required of the particular equation.

Normalization of a vector or vertex is a calculation that is used extensively within 3D APIs for lighting and texture coordinate generation. Lighting uses units vectors to generate vertex color data. Texture generation employs normalization to generate spherical coordinates. The components of a unit normal vector N' are calculated as follows:

$$N_x40 = N_x/(N_x^2+N_y^2+N_z^2)^{0.5}$$

$$N_y40 = N_y/(N_x^2+N_y^2+N_z^2)^{0.5}$$

$$N_z40 = N_z/(N_x^2+N_y^2+N_z^2)^{0.5}$$

where $N_x$, $N_y$, and $N_z$ define a normal vector N. Similarly, the components Ex', Ey', and Ez' of a unit eye vector E' pointing from the origin to a vertex (in eye coordinates) are calculated as follows:

$$E_x'=E_x/(E_x^2+E_y^2+E_z^2)^{0.5}$$

$$E_y'=E_y/(E_x^2+E_y^2+E_z^2)^{0.5}$$

$$E_z'=E_z/(E_x^2+E^{y2}+E_z^2)^{0.5}$$

where $E_x$, $E_y$, and $E_z$ are the eye coordinates of the vertex.

The graphics adapter should have the ability to calculate these two sets of three equations independent of each other. In other words, the graphics adapter should be able to calculate the N' and E' values either independently or in parallel. Since each equation requires three floating point multipliers and two floating point adders, an implementation could include 18 floating point multipliers and 12 floating point adders to handle all six equations in parallel. The number of resources could be reduced if the same multipliers and adders are reused in each set (i.e., all N' calculations as well as all E' calculations use the same floating point units). Such an implementation, however, would still require three floating point multipliers and two adders for the N' calculations and the same for the E' calculations, thus requiring a total of six floating point multipliers and four floating point adders. Because each floating point unit is a relatively expensive circuit to implement, even the fewer resources required of the shared implementation includes an undesirably large number of units. It would, therefore, be highly desirable to introduce a graphics adapter with a dedicated normalization unit that required fewer floating point resources and performed without a significant performance penalty over more costly implementations.

SUMMARY OF THE INVENTION

A normalization circuit suitable for use in a graphics adapter is disclosed. The circuit is configured to receive vertex data and includes a set of multiplexer circuits, a set of functional units, and a control circuit. The outputs of the set of multiplexer circuits provide inputs to the set of function units and the control circuit is configured to control the select inputs of the set of multiplexer units to calculate a unit normal vector and a unit eye vector from the received vertex data. The set of functional units may include a pair of floating point multipliers and a floating point adder. The inputs of the first floating point multiplier may be connected to outputs of first and second mulitplexers such that the first multiplier is enabled to generate square values for x, y, and z components of the vertex data. The inputs of the floating point adder may be connected to outputs of third and fourth multiplexers, wherein the floating point adders is enabled to generate a sum of squares values. The output of the floating point adder may be coupled to the input of an inverse square circuit. A first input to the second floating point multiplier may be connected to a fifth multiplexer circuit and a second input to the second floating point multiplier may be coupled to the output of the inverse square root circuit such that the second floating point multiplier is enabled to generate x, y, and z components of the unit normal vector and the unit eye vector.

BRIEF DESCRIPTION OF THE DRAWINGS

Other objects and advantages of the invention will become apparent upon reading the following detailed description and upon reference to the accompanying drawings in which.

Figure 1A:
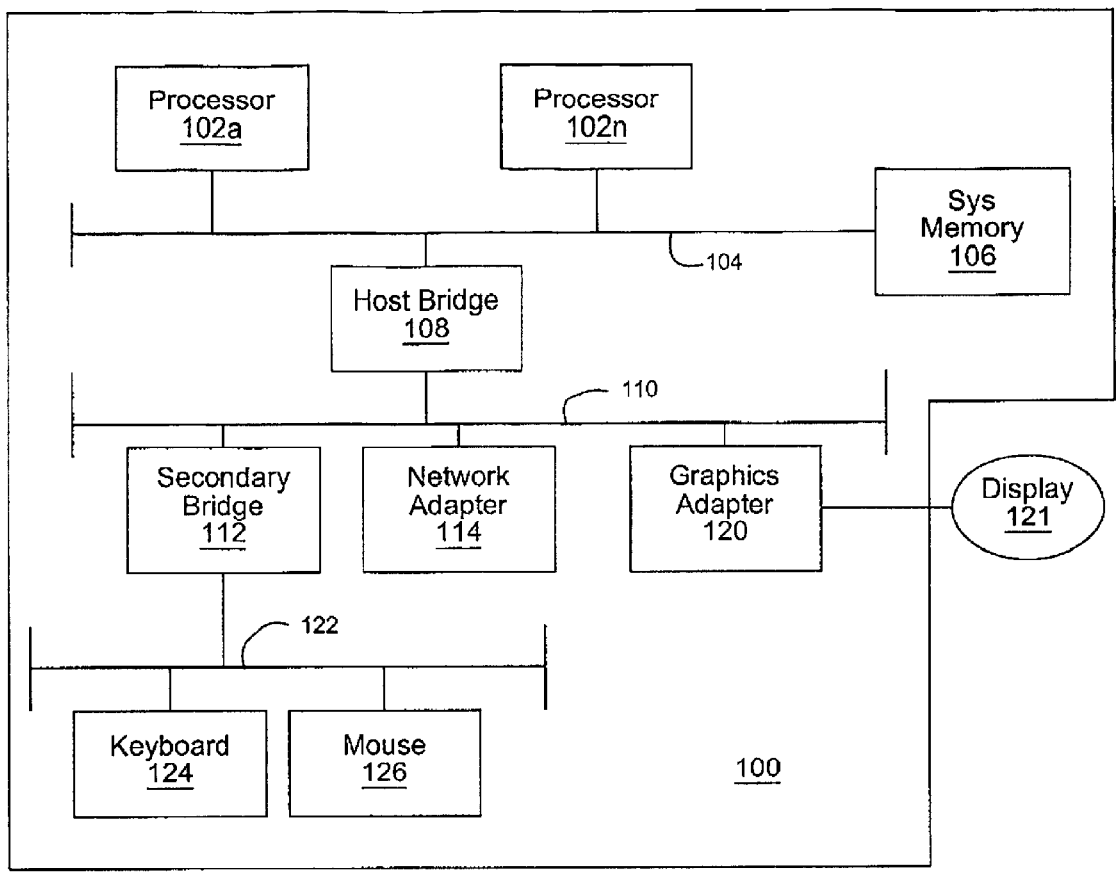
FIG. 1 is a block diagram of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of data processing system 100 according to one embodiment of the present invention. In the depicted embodiment, system 100 includes one or more processor(s) 102a through 102n (generically or collectively referred to herein as processor(s) 102) are connected to a system bus 104. Processors 102 may be implemented with any of a variety of microprocessor components including, as examples, PowerPC® processors from IBM Corporation, SPARC® processors from Sun Microsystems, and x86 compatible architectures such as the Pentium® family of processors from Intel Corporation and the Athlon® family of processors from Advanced Micro Devices, Inc.

A system memory (RAM) 106 is accessible to processors 102 via system bus 104. A host bridge 108 is connected between system bus 104 and an IO bus 110. IO bus 110 is typically implemented as a PCI bus (as specified in *PCI Local Bus Specification Rev.* 2.2 available from the PCI Special Interest Group at www.pcisig.com and incorporated by reference herein), or a PCI derivative such as the Advanced Graphics Protocol (AGP) bus defined by Intel Corporation. The depicted embodiment of system 100 includes various peripheral devices including a network adapter 114 suitable for connecting system 100 to computer network and a secondary bridge 120 that provides support for legacy 10 devices such as a keyboard 124 and a mouse 126. System 100 further includes a graphics adapter 120 connected to 10 bus 110. The graphics adapter 120 is enabled to process graphics data received via IO bus 110 and typically includes a video controller that controls the image displayed on a display device 121.

Figure 1B:
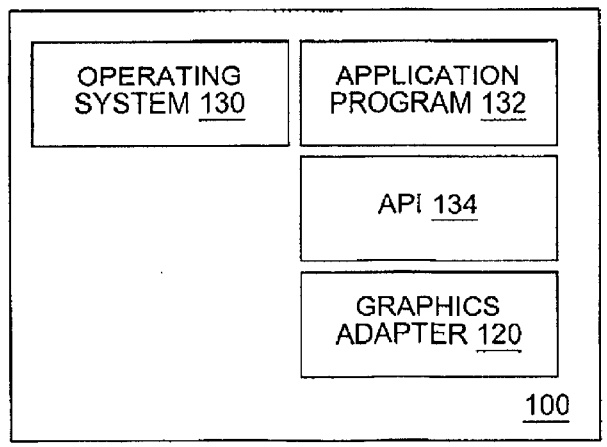

Referring now to FIG. 1B, a conceptual illustration of the system software relevant to the present disclosure is depicted. During system operation, system memory 106 may include all or portions of an operating system 130. Suitable operating systems include the AIX® operating system from IBM Corporation (or another Unix derivative operating system), a Windows® family operating system from Microsoft, or a network operating system such as JavaOS® from Sun Microsystems. An application program 132 generates graphics scenes that are passed to an API 134. In an embodiment particularly relevant to the present disclosure, API 134 may be the OpenGL® API, the DirectX® API, or another suitable 3D programming interface. API 134 processes graphics scenes generated by application program 132 and, via graphics adapter 120, maintains the contents of a video display screen, plotter, or other suitable output device.

Figure 2:
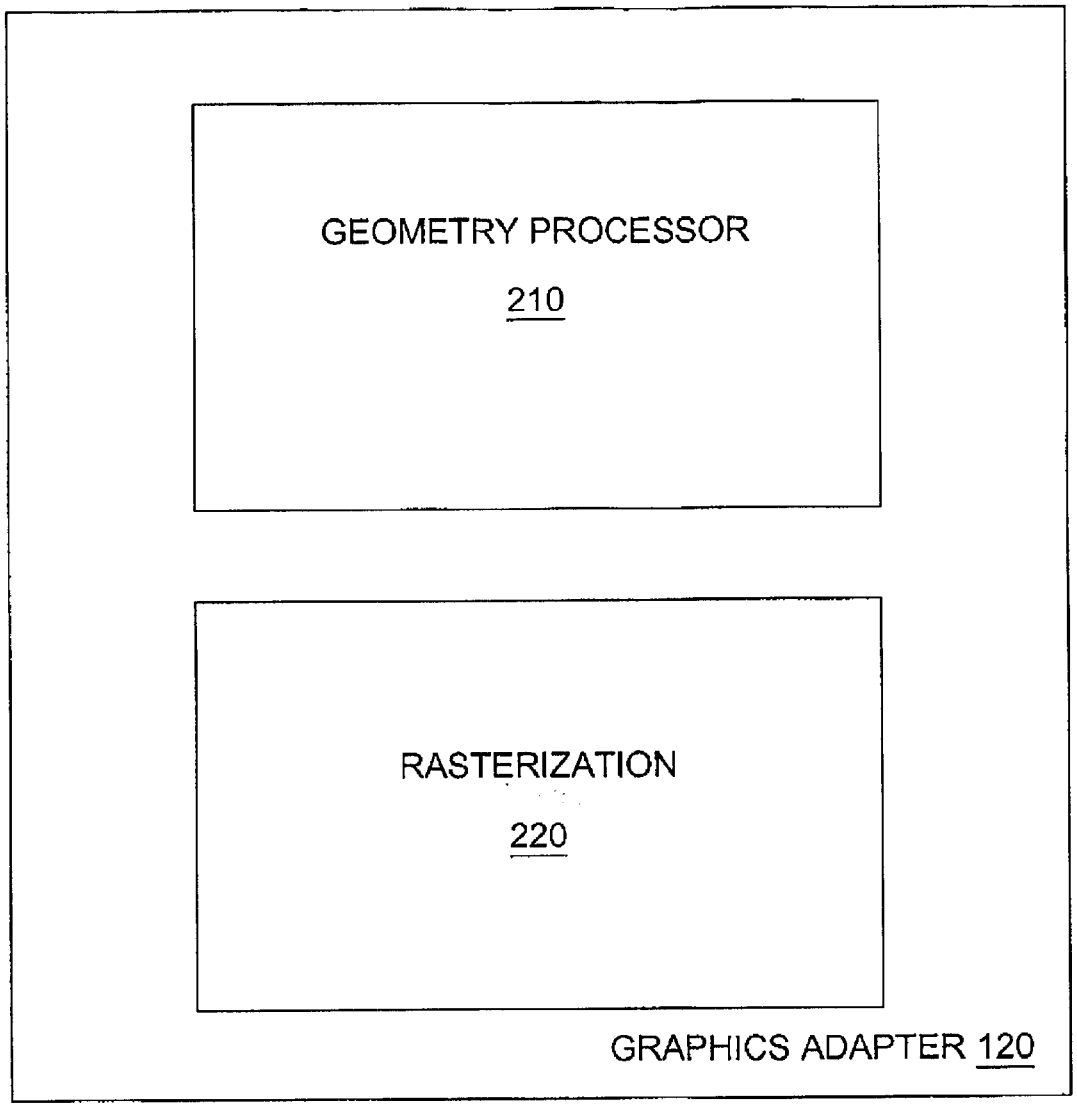
FIG. 2 is a block diagram of an embodiment of the graphics adapter of FIG. 1.

As depicted in FIG. 2, graphics adapter 120 includes a geometry processor 210 and a rasterization portion (rasterizer) 220. The geometry processor 210 performs complex calculations in response to data received from API 134 to generate the attributes specified by API 134. Rasterizer 220 determines pixel values for the display device based upon information received from geometry processor 210 and maintains the contents of a frame buffer or other suitable graphics storage facility that is used to store a representation of the image that is displayed by the display device.

Figure 3:
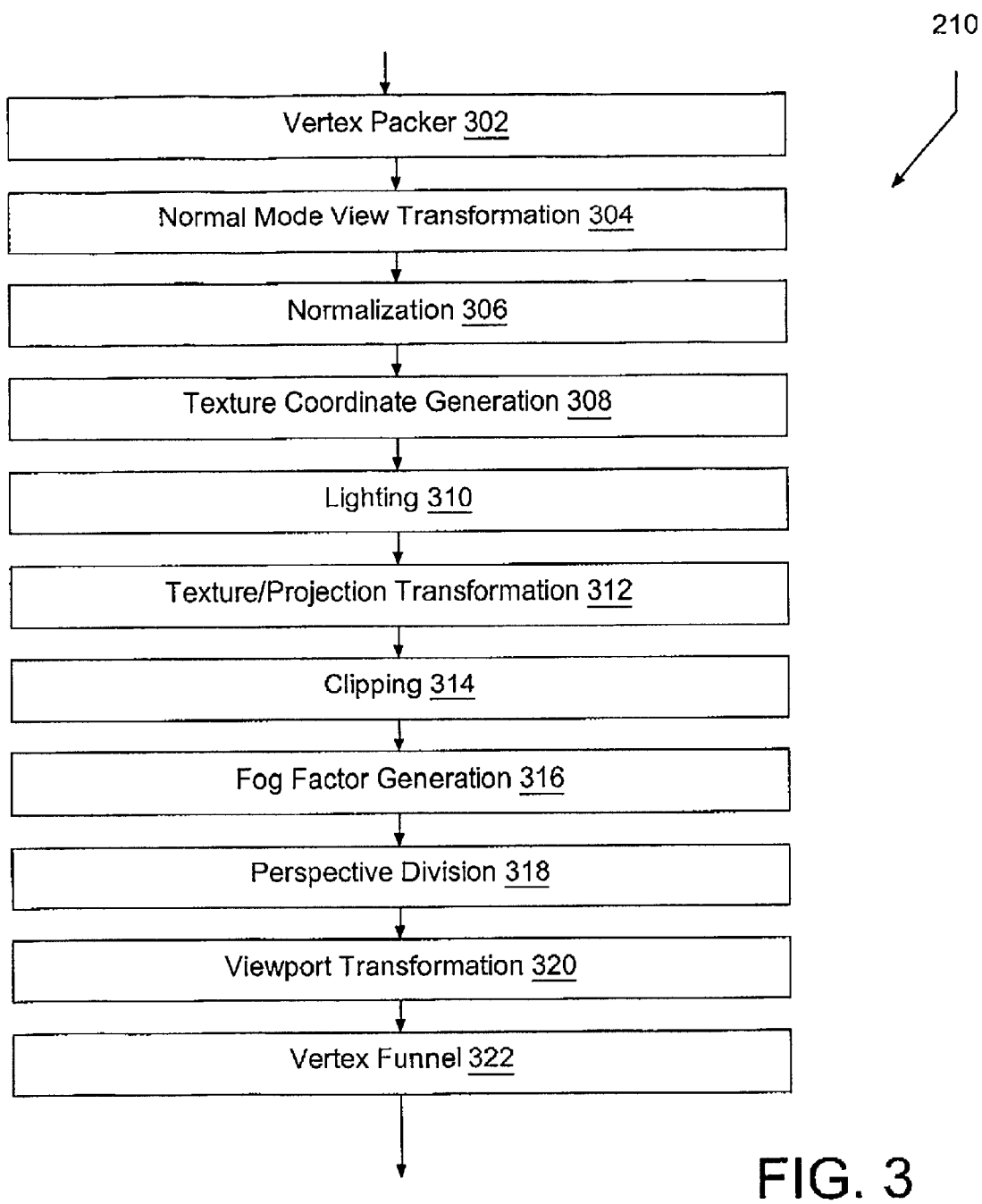
FIG. 3 is a block diagram of an embodiment of a geometry pipeline of the graphics adapter of FIG. 2.

Referring now to FIG. 3, a simplified block diagram of one embodiment of a geometry processor (also referred to as geometry pipeline) 210 is presented. In the depicted embodiment, geometry pipeline 210 receives data generated by API 134. In one embodiment, geometry processor 210 includes an interface that receives data, including commands and object coordinates, from IO bus 110 in 32-bit chunks. A vertex packer 302 converts the 32-bit chunks into a vertex width internally supported by geometry pipeline 210. At various stages in pipeline 210, the vertex width may vary depending upon the data that is required by the stage. In addition, vertex packer 302 provides default values (pursuant to the API 134) for vertex attributes that are not specified by the application program.

Vertex packer 302 forwards object coordinates to normal/model view transformation stage 304 where the normal vector is transformed from object space into eye space and the object coordinates are transformed into eye coordinates by translating, scaling, and rotating objects. The normalization stage 306 changes a normal vector to a vector of unit length (i.e., a vector having a magnitude of 1.0), while preserving the direction of the original vector. In addition, normalization stage 306 may generate normalized eye coordinates. The texture coordinate generation block 308, as its name implies, is responsible for generating object linear, eye linear, or spherical texture coordinates.

The lighting stage 310 generates the color of each vertex of an object based on the orientation of the object and its material properties as well as the properties of the scene and any light sources that are defined. Texture/projection transformation stage 312 transforms texture coordinates and moves objects into a viewing volume by transforming eye coordinates into clip coordinates by translating, rotating, and scaling objects. Perspective projection makes objects that are further away from the viewer appear smaller whereas orthogonal projection does not.

Clipping stage 314 clips objects to a defined viewing volume while fog factor generation stage 316 makes objects fade into the distance by making objects further from the viewer less visible than objects closer to the viewer. The perspective division stage 318 transforms clip coordinates to normalized device coordinates [−1,+1] by dividing by the 4th coordinate (the W coordinate). The viewport transformation stage 320 facilitates the rasterization process by transforming normalized device coordinates into screen or window coordinates. In addition, viewport transformation stage 320 may convert one or more floating point values to fixed point values. Finally, the vertex funnel 322 converts the internal vertex format into a 32-bit suitable for an output interface of geometry processor 210.

Figure 4:
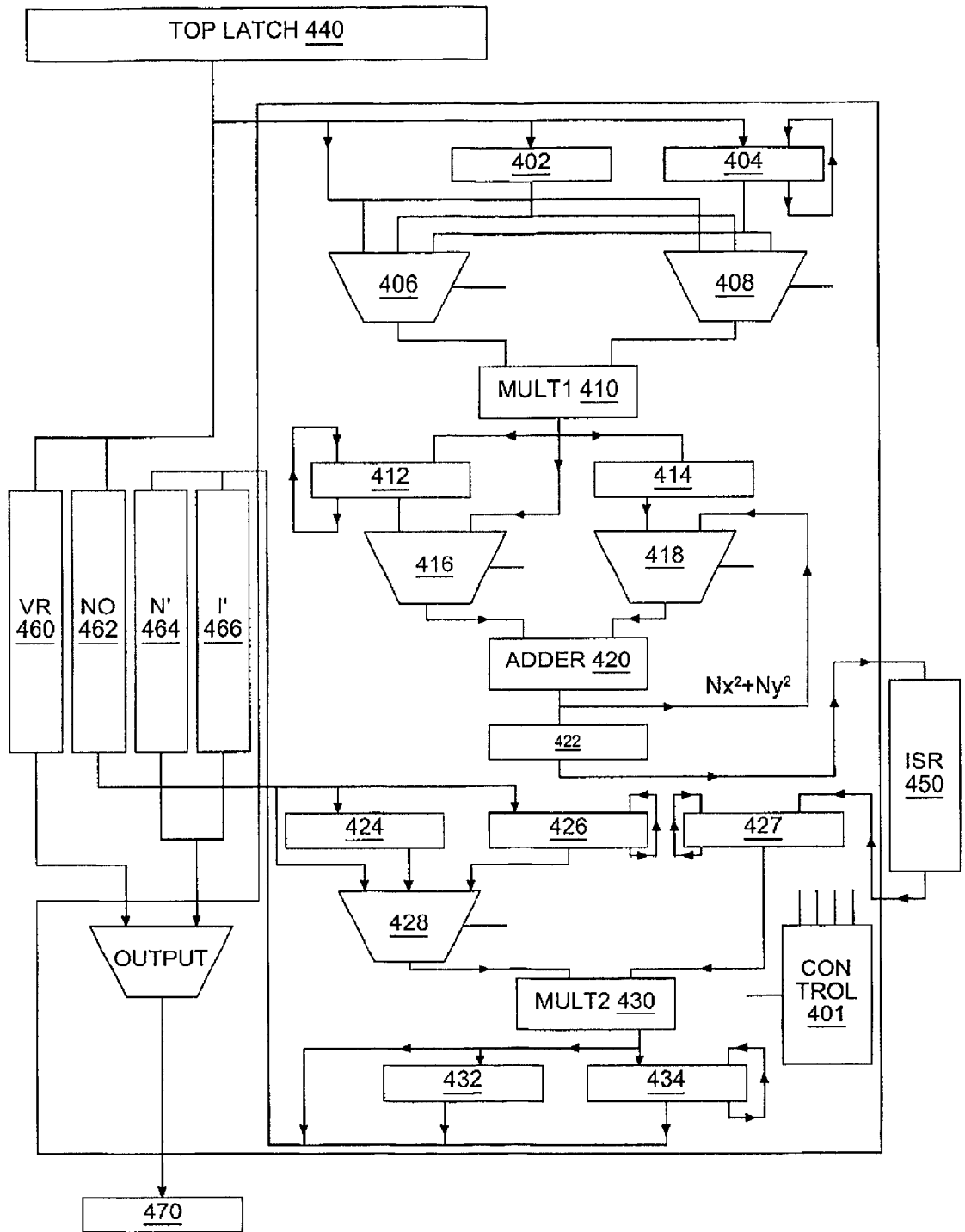
FIG. 4 is a block diagram illustrating functional blocks of a normalization stage of FIG. 3.

Turning now to FIG. 4, a block diagram of a normalization circuit 400 according to one embodiment of the invention and suitable for use in the normalization stage 306 described above with respect to FIG. 3. As indicated previously, normalization stage 306 is responsible for generating a unit normal vector N' required for lighting purposes and normalized eye coordinates (also referred to herein as the unit eye vector) that are needed to generate texture coordinates in sphere mode according to the OpenGL® specification. Generally speaking, normalization circuit 400 is enabled to receive vertex data including positional coordinates, normal vectors, color data, and texture coordinates. From the received vertex data, normalization circuit 400 generates a unit normal vector N' that is used in lighting and a unit eye vector E' that is used to generate sphere mode texture coordinates. Normalization circuit 400 is typically a pipelined circuit that enables the reuse of the various functional units to reduce the size and cost of the circuit without sacrificing a significant performance penalty.

In the depicted embodiment, the normalization circuit 400 includes a set of functional units, a set of multiplexer circuits, latching circuitry, and a controller 401 that controls the select inputs of the multiplexer circuits. The outputs of the multiplexer circuits provide inputs to the various functional units which are used repetitively to calculate the components of N' and E'. In the depicted embodiment, the set of functional units is limited to a first floating point multiplier 410, a floating point adder 420, and a second floating point multiplier 430. First multiplier circuit 410 is responsible for generating square values ($N_x^2$, $N_y^2$, $N_z^2$, $E_x^2$, $E_y^2$, and $E_z^2$), which are then summed appropriately using adder 420 to produce sum of squares values. The sum of square values provide input to inverse square root circuit (ISR) 450 that returns a value equal to the reciprocal of the square root of the input. The output of ISR 450 serves as the denominator for calculating the components of the unit normal vector N' and the unit eye vector E'. These outputs are then multiplied by the x, y, and z components of the normal vector N and eye vector I to produce the components of unit vectors N' and E'.

Because calculating the unit normal vector N' is mathematically analogous to calculating the unit eye vector E', normalization circuit is suitable for handling both calculations with appropriate timing. Control unit 401 manipulates the select inputs to the various multiplexers to control the inputs to the functional units so that both unit vectors are calculated using only three floating point circuits.

Vertex data is received by normalization circuit 400 from a top latch 440. The vertex data typically includes positional eye coordinates Ex, Ey, and Ez, and a normal coordinates Nx, Ny, and Nz. Depending upon the API command that is in effect, controller 401 will begin to calculate the unit eye vector E', the unit normal vector N', or both. If, for example, the API does not currently have sphere mode texture coordinates enabled, the unit eye vector E' is not calculated. If both unit vectors are requested, normalization circuit 400 initiates calculation of the unit eye vector E' first and stalls the vertex data in top latch 440 until the eye coordinates square values (i.e., $E_x^2$, $E_y^2$, and $E_z^2$) have been calculated by first multiplier 410.

In the depicted embodiment, generating the square values is a three cycle operation that utilizes latches 402 and 404 and multiplexer 406 and 408. In the first cycle that x-component is routed directly to multiplexers 406 and 408 and controller 401 selects the x-component inputs for both multiplexers thereby causing the x-component value to flow to both inputs of first floating point multiplier where the quantity $X^2$ is generated (Either $N_x^2$ or $E_x^2$). During a second cycle, the controller 401 selects the output of latch 402, to which the y-component of the vector is routed, as the input to first multiplier 410 to produce the $Y^2$ values while, during a third cycle, controller 401 selects the output of latch 404 which has a feed back loop that retains the input value for an additional cycle, which receives the z-component of the vector as the multiplexer inputs to route the z-components to first multiplier 410. Thus, on consecutive cycles, multiplexer 410 produces the $X^2$, $Y^2$, and $Z^2$ values of the appropriate vector.

The output of first multiplier 410 is connected to a first input of multiplexer 416 and to latches 412 and 414. When first multiplier 410 produces the $X^2$ component, it is latched into latch 414. In the next cycle, when the first multiplier 410 produces the $Y^2$ component, which is routed directly to multiplexer 416, control unit 401 selects the appropriate inputs of multiplexers 416 and 418 to route the $X^2$ and $Y^2$ components to floating point adder 420 to produce the value $X^2+Y^2$. The $X^2+Y^2$ value is routed back to multiplexer 418 while the $Z^2$ component produced by multiplexer 410 is routed to multiplexer 416 after being stalled in latch 412 for an additional cycle by the feedback loop. Control unit 401 selects the $Z^2$ component from multiplexer 416 and the and the $X^2+Y^2$ component from multiplexer 418 as the inputs to adder 420 to generate a the sum of squares value $X^2+Y^2+Z^2$. The sum of squares value is the routed through a latch 422 to ISR 450, which is a preferably a dedicated circuit that computes receives a floating point value F and calculates a value $F^{-0.5}$ from the input. Accordingly, upon receiving the sum of squares value from latch 422, ISR 400 produces a denominator value equal to $(X^2+Y^2+Z^2)^{-0.5}$ In the depicted embodiment, the normalization stage 306 includes multiple low power register arrays (LPRAs). In the depicted embodiment, a vertex LPRA 460 is suitable sized to store vertex data, normal LPRA 462 is configured to store normal data, and N' and E' LPRAs 464 and 466 are suited for storing the unit normal vector N' and unit eye vector E' produced by normalization circuit 400. When the vertex data is initially retrieved from top latch 440 by normalization circuit 400, the vertex and normal data is simultaneously stored in vertex LPRA 460 and normal LPRA 462. Following the calculation of the denominator value by ISR 450, the original normal value components $N_x$, Ny, and Nz (or Ex, Ey, and Ez if E' is being calculated) are retrieved from normal LPRA 462. In one embodiment, normal LPRA 462 is configured as an N×96 bit register array suitable for storing N sets of three 32-bit floating point values corresponding to the components of N normal vectors.

The values retrieved from normal LPRA 462 are routed to a first input of multiplexer 428 and to latches 424 and 426. The output of multiplexer 428 provides a first input to the second multiplier 430, which is responsible for multiplying the x, y, and z components of the normal (or eye) vector by the denominator produced by ISR 450. The output of ISR 450 is connected to a latch 427, which provides the second input to multiplier 430. Control circuit 401 controls the select input of multiplexer 428 to connect the x-component, y-component, and z-component to second multiplier 430 in consecutive cycles to produce the x, y, and z components of the unit vector at the output of second multiplier 430 in consecutive cycles.

In the depicted embodiment, the output of second multiplier 430 is latched into latches 432 and 434 such that the entire 96-bit component of the unit vector is routed to N' LPRA 464 or E' LPRA 466 simultaneously following the calculation of the unit vector's z-component. Ultimately, the vector data stored in vector LPRA 460, and the unit vector data stored in N' LPRA 464 and E' LPRA 466 are provided to an output multiplexer and forwarded to an output latch 470, from which the data is delivered to subsequent stages in the geometry pipeline.

Thus, it will be apparent to those skilled in the art having the benefit of this disclosure that the present invention contemplates a dedicated and efficient hardware solution for determining normal vectors in a graphics adapter. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. In a graphics adapter, a normalization circuit configured to receive vertex data including positional coordinates and normal coordinates, the circuit comprising:
   a set of multiplexers;
   a set of functional units comprising less than four floating point multipliers and less than three floating point adders, wherein the outputs of the set of multiplexer circuits provide inputs to the set of functiontional units; and
   a control circuit, configured to control the select inputs of the set of multiplexer units thereby controlling the inputs to the functional units to calculate a unit normal vector and a unit eye vector from the received vertex data
   wherein the normalization circuit is configured to compute both the unit normal vector and the unit eye vector by initiating calculation the unit eye vector, stalling the vertex data in a latch until a portion of the unit eye vector calculation is completed and initiating the unit normal calculation.

2. The circuit of clam 1, wherein the set of functiontional units includes not more than a first and a second floating point multiplier and not more than a single floating point adder.

3. The circuit of claim 2, wherein inputs of the first floating point multiplier are connected to outputs of first and second mulitplexers and further wherein the first multiplier is enabled to generate square values for x, y, and z components of the vertex data.

4. The circuit of claim 3, wherein inputs of the floating point adder are connected to outputs of third and fourth multiplexers, wherein the floating point adders is enabled to generate a sum of squares values.

5. The circuit of claim 4, wherein the output of the floating point adder is coupled to the input of an inverse square circuit.

6. The circuit of claim 5, wherein a first input to the second floating point multiplier is connected to a fifth multiplexer circuit and wherein the second input to the second floating point multiplier is coupled to the output of the inverse square root circuit, wherein the second floating point multiplier is enabled to generate x, y, and z components of a unit vector.

7. The circuit of claim 1, wherein the calculation of the unit normal vector is stalled until eye coordinate square values are generated by the first floating point multiplier.

8. The circuit of claim 1, wherein a common set of functional units is used to compute the unit eye vector and the unit normal vector.

9. A data processing system including processor, memory, input means, and display, the system further including a graphics adapter with a normalization circuit configured to receive vertex data including positional coordinates and normal coordinates, the circuit comprising:
   a set of multiplexers;
   a set of fictional units comprising less than four floating point multipliers and less than three floating point adders, wherein the outputs of the set of multiplexer circuits provide inputs to the set of functional units; and
   a control circuit, configured to control the select inputs of the set of multiplexer units thereby controlling the inputs to the functional units to calculate a unlit normal vector and a unit eye vector from the received vertex data;
   wherein the circuit is configured to compute both the unit normal vector the unit eye vector by initiating calculation of the unit eye vector, stalling the vertex data in a latch until a portion of the unit eye vector calculation is completed and initiating the unit normal calculation.

10. The system of claim 9, wherein the set of functional units includes not more than a first and a second floating point multiplier and not more than a single floating point adder.

11. The system of claim 10, wherein inputs of the first floating point multiplier are connected to outputs of first and second mulitplexers and father wherein the first multiplier is enabled to generate square values for x, y, and z components of the vertex data.

12. The system of claim 11, wherein inputs of the floating point adder are connected to outputs of third and fourth multiplexers, wherein the floating point adders is enabled to generate a sum of squares values.

13. The system of claim 12, wherein the output of the floating point adder is coupled to the input of all inverse square circuit.

14. The system of claim 13, wherein a first input to the second floating point multiplier is connected to a fifth multiplexer circuit and wherein the second input to the second floating point multiplier is coupled to the output of the inverse square root circuit, wherein the second floating point multiplier is enabled to generate x, y, and z components of a unit vector.

15. The system of claim 9, wherein the calculation of the unit normal vector is stalled until eye coordinate square values are generated by the first floating point multiplier.

16. The system of claim 9, wherein a common set of functiontional units is used to compute the unit eye vector and the unit normal vector.

* * * * *

UNITED STATES PATENT AND TRADEMARK OFFICE
CERTIFICATE OF CORRECTION

PATENT NO. : 6,683,621 B1
DATED : January 27, 2004
INVENTOR(S) : Javier A. Rodriguez It is certified that error appears in the above-identified patent and that said Letters Patent is hereby corrected as shown below:

Column 2,
Line 42, Equations should read:
--
$$N_x' = N_x / (N_x^2 + N_y^2 + N_z^2)^{0.5}$$
$$N_y' = N_y / (N_x^2 + N_y^2 + N_z^2)^{0.5}$$
$$N_z' = N_z / (N_x^2 + N_y^2 + N_z^2)^{0.5}$$
--

Column
Lines 39-58, Claim 9, should read as follows:

9. A data processing system including processor, memory, input means, and display, the system further including a graphics adapter with a normalization circuit configured to receive vertex data including positional coordinates and normal coordinates, the circuit comprising:
 a set of multiplexers;
 a set of functional units comprising less than four floating point multipliers and
  less than three floating point adders, wherein the outputs of the set of
  multiplexer circuits provide inputs to the set of functional units; and
a control circuit, configured to control the select inputs of the set of multiplexer units
 thereby controlling the inputs to the functional units to calculate a unit
 normal vector and a unit eye vector from the received vertex data;
wherein the circuit is configured to compute both the unit normal vector the unit eye vector by initiating calculation of the unit eye vector, stalling the vertex data in a latch until a portion of the unit eye vector calculation is completed and initiating the unit normal calculation.

Column 8,
Lines 63-67, Claim 11, should read as follows:
 11. The system of claim 10, wherein inputs of the first floating point multiplier are connected to outputs of first and second multiplexers and further wherein the first multiplier is enabled to generate square values for x, y, and z components of the vertex data.

UNITED STATES PATENT AND TRADEMARK OFFICE
CERTIFICATE OF CORRECTION

PATENT NO. : 6,683,621 B1
DATED : January 27, 2004
INVENTOR(S) : Javier A. Rodriguez It is certified that error appears in the above-identified patent and that said Letters Patent is hereby corrected as shown below:

Column 9,
Lines 5-7, Claim 13, should read as follows:
  13. The system of claim 12, wherein output of the floating point adder is coupled to the input of an inverse square circuit.

Column 10,
Lines 7-9, Claim 16, should read as follows:
  16. The system of claim 9, wherein a common set of functional units is used to compute the unit eye vector and the unit normal vector.

Signed and Sealed this

Third Day of August, 2004

JON W. DUDAS
*Acting Director of the United States Patent and Trademark Office*